F. WEGNER.
BEAN SNIPPER.
APPLICATION FILED FEB. 9, 1916.
1,257,164.
Patented Feb. 19, 1918.
2 SHEETS—SHEET 1.
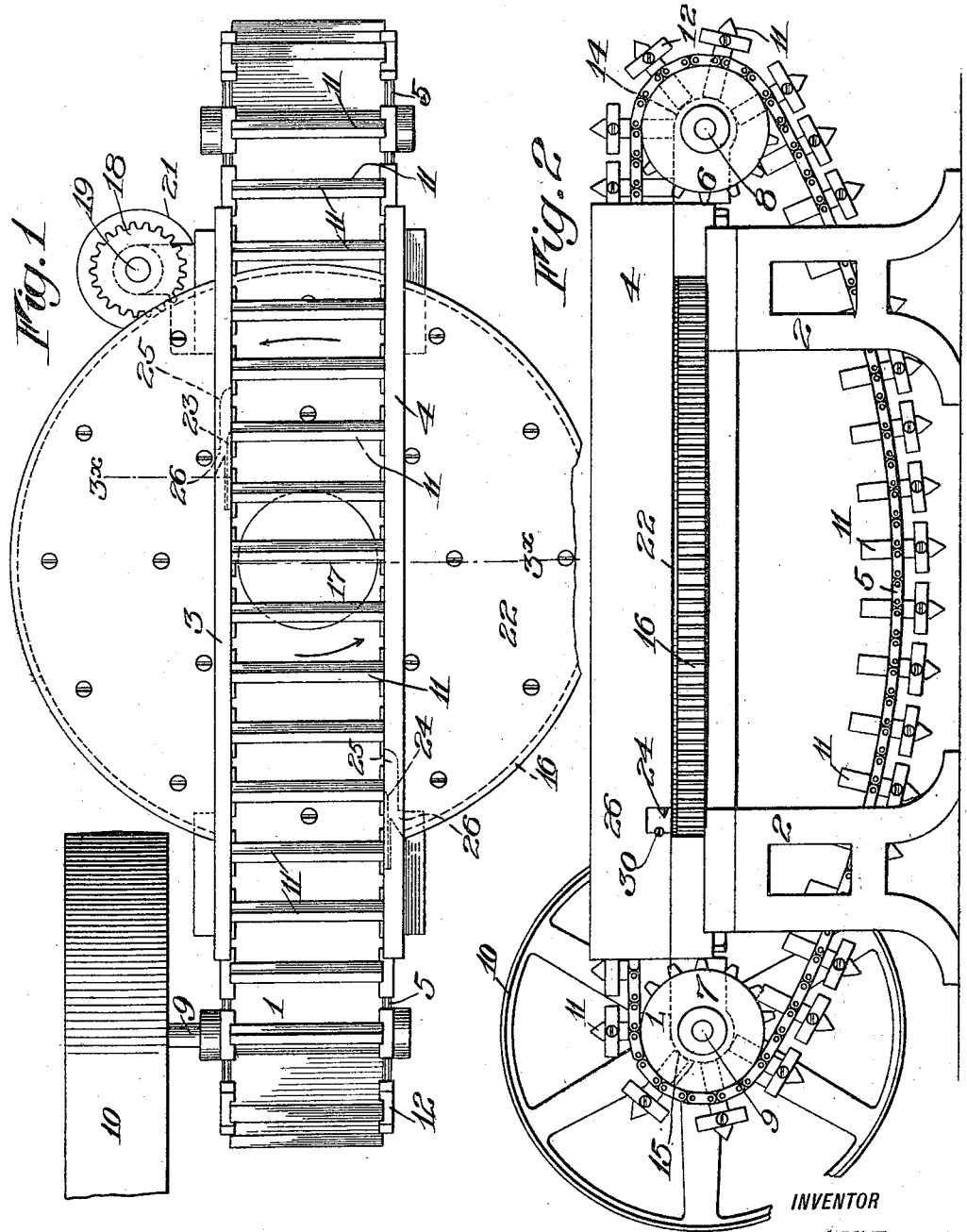
INVENTOR
Fred Wegner
BY
his ATTORNEYS

F. WEGNER.
BEAN SNIPPER.
APPLICATION FILED FEB. 9, 1916.

1,257,164.

Patented Feb. 19, 1918.
2 SHEETS—SHEET 2.

INVENTOR
Fred Wegner
BY
his ATTORNEYS

UNITED STATES PATENT OFFICE.

FRED WEGNER, OF FAIRPORT, NEW YORK, ASSIGNOR TO GEORGE W. COBB, OF MONTCLAIR, NEW JERSEY.

BEAN-SNIPPER.

1,257,164.   Specification of Letters Patent.   Patented Feb. 19, 1918.

Application filed February 9, 1916. Serial No. 77,144.

*To all whom it may concern:*

Be it known that I, FRED WEGNER, of Fairport, county of Monroe, and State of New York, have invented certain new and useful Improvements in Bean-Snippers; and I do hereby declare the following to be a full, clear, and exact description of the same, reference being had to the accompanying drawings, forming a part of this specification, and to the reference-numerals marked thereon.

My present invention has for its object to provide a machine for severing and removing the ends of various articles, and particularly string beans, an operation generally known as "snipping." In designing a machine of this kind I have provided means for conveying beans, or other articles continuously along a suitable support, both laterally, in opposite directions and longitudinally of the support at the same time in order to place each article relatively to oppositely positioned cutters in such a way that the cutters will serve to remove the end portions of said articles. To these and other ends the invention consists in certain improvements and combinations of parts all as will be hereinafter more fully described, the novel features being pointed out in the claims at the end of the specification.

In the drawings:

Figure 1 is a top plan view of a machine illustrating one embodiment of my invention;

Fig. 2 is a side elevation thereof;

Similar reference numerals throughout the several views indicate the same parts.

Figure 4:
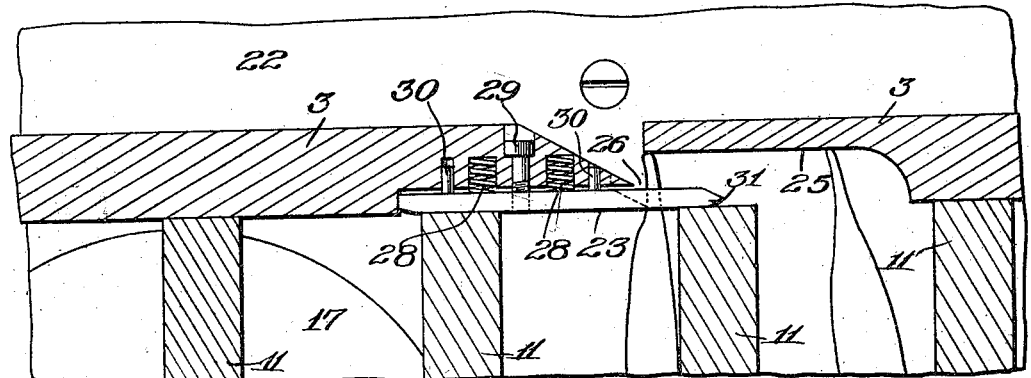
Fig. 4 is an enlarged detail horizontal sectional view taken on line $4^x$—$4^x$ of Fig. 3.

In carrying out my invention, I employ a platform or table, over which travels a continuously moving conveyer having pockets which receive the beans or other objects to be treated, the pockets being open at the bottom so that the objects themselves rest upon the table while they are carried along by the feeding devices. These pockets are also open at their ends so that the articles resting therein may, during certain portions of their travel, be projected into alinement with the cutting devices or knives which are preferably arranged stationary with respect to the feeding device or conveyer. Lengthwise movement of the beans, or other objects to be treated, in a direction transverse to their path of movement longitudinally of the table is effected preferably by a single revolving carrier moving the beans in opposite directions as they are carried lengthwise of the table by the conveyer, at which time their ends are adapted to be removed.

One embodiment of my invention comprises a frame work consisting of a long and somewhat narrow table 1 supported upon uprights or standards 2, and having at its opposite sides the upwardly extending guards or rails 3 and 4. The latter are separated a distance slightly greater than the total length of the beans to be snipped, or other articles to be treated, the space between them forming a passageway through which travels an endless conveyer. The latter is preferably formed by chains 5 supported at opposite ends of the frame on pairs of sprockets 6 and 7 mounted on the shafts 8 and 9, one of which is provided with a pulley 10 adapted to be driven by any suitable source of power. Connected to the chains at equidistant points throughout their lengths are blocks or pusher heads 11, the lower edges of which are adapted to travel along the upper face of the table 1, in this position passing freely between the guards 3 and 4. The chains are received in longitudinal slots in the guards, and in order to hold the pusher heads or blocks 11 in vertical position during their movement across the face of the table they are each provided near their upper ends with guide members 12 which pass into and move longitudinally along guideways 13 in the rails or guards 3 and 4. The entering and departure of these guide members into and out of their guideways is assured and facilitated by providing the ends of the table with rounded portions, as indicated at 14 and 15, which are concentric with the bearings of the shafts 8 and 9.

The feeding devices just described move continuously over the face of the table in the direction indicated by the arrows in Figs. 1 and 2. The articles to be treated are supplied to the pockets either by hand, or by any suitable feeding mechanism adapted to segregate them and supply one article to each pocket, and in this separated condition are transported over the face of the table. During their travel each article is moved alternately in opposite directions, to cause one of its ends to engage or abut the rail or guard 3 and the other the guard 4.

Figure 5:
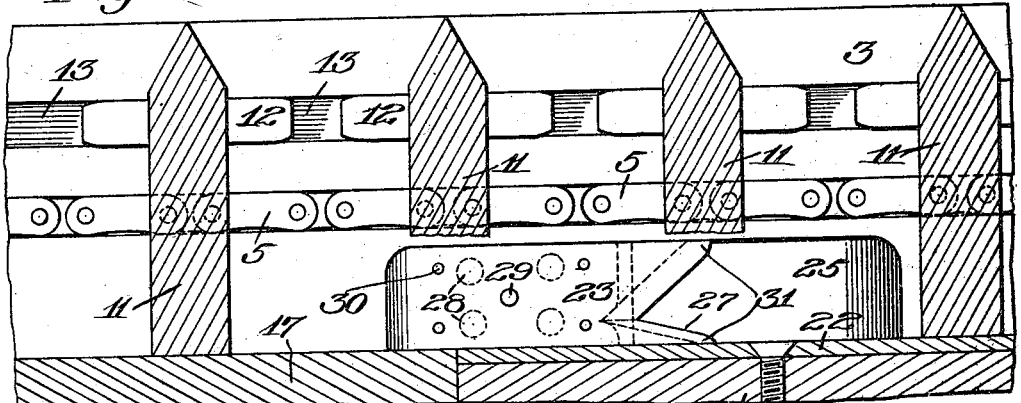
Fig. 5 is an enlarged vertical sectional view further illustrating the parts shown in Fig. 4.
Figure 3:
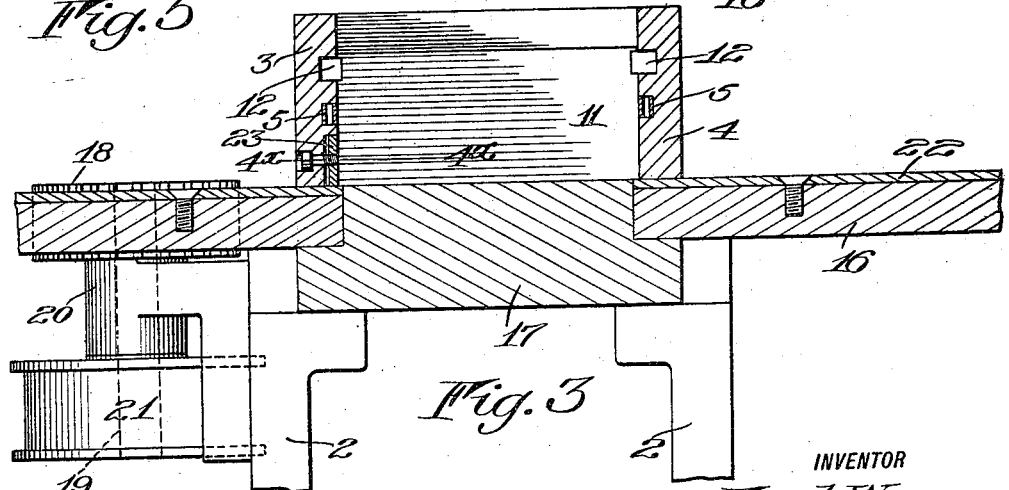
Fig. 3 is a cross sectional view taken on line $3^x$—$3^x$ of Fig. 1.

In carrying out this feature of my invention, I insert in a recess formed in the top of the table a carrier in the form of a disk 16 considerably larger in diameter than the width of the table so that its edges project beneath and beyond the rails 3 and 4. The disk or carrier is journaled upon a hub or bearing 17 formed preferably integral with the table 1 as shown in Fig. 3. The carrier is provided on its periphery with gear teeth adapted to mesh with the teeth of a gear wheel 18 rigidly connected with a shaft 19 journaled in a bearing bracket 20 secured upon one of the standards 2 as shown in Figs. 1 and 3. The gear wheel 18 is driven by a pulley 21 carried by the shaft 19. In order to provide a smooth surface upon the face of the carrier I place thereon a finished face plate 22 upon which the beans or other articles travel as they are carried along by the conveyer. The face plate 22 is positioned flush with the top of the table 1 as shown in Fig. 3. Arranged upon the rails 3 and 4 at points above the face plate 22 are cutters 23 and 24, one of which is shown in detail in Figs. 4 and 5. The cutters are mounted in recesses provided in the lower edges of the rails. The forward edges of the cutters extend in the same direction at equal distances from the center of the carrier and the recesses are cut away to provide a space into which the end of the bean, or other article, may be projected, as shown in Fig. 4, the width of the recess, or the distance its side wall 25 is offset from the inner face of the rail determining the length of that portion of the bean which will be snipped or cut off. An opening 26 is also provided at the end of this surface through which the severed portion of the object may be expelled.

Each of the cutters has a V-shaped knife edge which coöperates with the adjacent end of the pushers or blocks 11 as these pass the knives successively. The latter are also formed with forwardly extending fingers 27, resting against the face plate 22 and serving to slightly elevate the end of the bean before the cutting action takes place. These fingers on the knives serve to support the bean during the cutting action and prevent its being crowded or forced down into contact with the moving face of the carrier. The knives are yieldingly supported and are moved inwardly so as to lie in close contact with the ends of the pushers by means of a plurality of springs 28, their inward movement being limited by a screw 29. Guide pins 30 are also employed to prevent the tilting of the blades, and the forward edges of the latter are rounded slightly, as indicated at 31 so that as each pusher 11 advances into engagement with the knife its extremity will not be injured, the rounding edge acting to deflect the knife sufficiently to permit the pusher to pass it.

In the use of the apparatus for snipping string beans, the latter are deposited in the pockets of the conveyer at the forward end of the table. The heads or pushers 11 as they advance between the guards or rails, convey the beans onto the top surface of the carrier. The carrier is rotating in the direction indicated by the arrow and imparts a longitudinal or lengthwise movement to the bean, causing its attenuated tip to be held against the inner face of the rail 3, until it reaches the recess therein when it will also be moved so that its extremity, or that portion which is to be severed, lies within the recess, and it is held in this position while being guided into engagement with and moved past the cutter 23, as shown in Fig. 4. The conveyer in moving forwardly subsequently transports the beans contained in the several pockets beyond the center of the carrier, after which time the beans are moved toward the rail 4 by the action of the carrier and are projected lengthwise into engagement with the inner face of said rail, their opposite or unsevered extremities passing into the recess in the rail in front of the knife or cutter 24. The snipping operation on both ends of the beans being completed in this manner, the beans are discharged from the machine as the pockets become inverted in their travel about the sprocket wheels 7, at which time they may be collected, as will be understood, in any convenient form of receptacle, illustration of which has been omitted. By this means a single revolving carrier in coöperation with the conveyer is made to transport the beans, first to one side of the table and then to the other, and in each case in front of a knife adapted to successively sever the ends of the beans before they are discharged from the table.

An apparatus constructed in accordance with my invention is simple in form and operation and comprises but few parts which may be quickly and readily assembled. Machines embodying my invention are particularly adapted for snipping beans and the means employed for handling the beans is such that they are not injured or bruised and caused to become tarnished, a condition which greatly affects their selling qualities.

I claim as my invention:

1. The combination with a movable conveyer having open ended pockets, guards at opposite sides of the conveyer closing the ends of the pockets, each guard being provided with a recess, of cutters located in said recesses, and a revolving carrier for moving articles placed in said pockets alternately in opposite directions to project their extremities into said recesses and in positions to be carried into engagement with the cutters.

2. The combination with a horizontally movable conveyer having open ended pockets extending transversely thereof, and guards at opposite sides of the conveyer closing the ends of said pockets each having an opening, the opening in one of the guards being located in rear of the opening in the other guard relatively to the direction of movement of said conveyer, of cutters arranged in said openings and coöperating with the ends of the walls of the pockets, and a revolving carrier adapted to coöperate with articles placed in the pockets for moving them longitudinally therein to first engage one cutter and subsequently engage the other cutter during the continuous movement of the conveyer.

3. The combination with a table, an endless conveyer passing around the table composed of spaced pusher heads and connecting chain links, sprocket wheels at the ends of the table around which the chains pass and rounded portions on the ends of the table coöperating with the heads as the latter pass onto and off of the table top, of guards at opposite sides of the conveyer having guideways, means carried by the heads coöperating with the guideways to hold the heads in an upright position during their passage between the guards, cutters at opposite sides of the conveyer, and a revolving carrier for imparting endwise movement to articles lying in front of the heads to position said articles so that the heads will carry the articles into engagement with the cutters.

4. The combination with a conveyer, a revolving carrier adapted to move articles carried by the conveyer transversely thereof in opposite directions, and means at each side of the conveyer for severing the ends of the articles.

5. The combination with a table provided with a recess, a rotatable carrier mounted in the recess, cutters located at each side of the table above the carrier, of a conveyer movable across the top of the table and the carrier and adapted to coöperate with the carrier in transporting articles into engagement with said cutters.

6. The combination with a recessed table top, a carrier arranged therein and means for rotating the same, of oppositely positioned cutters located above the carrier one relatively in advance of the other, and a conveyer having pockets open at the bottoms and ends and adapted to carry articles across the table between the cutters, the carrier acting to carry the articles transversely of the table in opposite directions into engagement with the cutters.

7. The combination with a recessed table top, a carrier arranged therein, means for driving the carrier, of cutters located above the carrier and means for conveying articles across the carrier in engagement therewith whereby the articles are moved in opposite directions by the carrier so that their ends are severed by the cutters.

8. The combination with a table top provided with a recess and having a bearing arranged in the recess, a carrier journaled on the bearing, means for rotating the carrier upon the bearing, of a cutter arranged upon opposite sides of the bearing and means coöperating with the carrier when in rotation for transporting articles successively into engagement with the cutters.

9. The combination with a table, a conveyer movable thereon having spaced pusher heads forming pockets between them and a guard at each side of the conveyer, of knives yieldingly supported on the inner sides of the guards at the ends of the pusher heads, and a carrier adapted to move articles carried by the pockets transversely thereof into engagement with the knives.

FRED WEGNER.

Witnesses:
RUSSELL B. GRIFFITH,
B. F. BUTLER.

Copies of this patent may be obtained for five cents each, by addressing the "Commissioner of Patents, Washington, D. C."